Patented Dec. 7, 1937

2,101,032

UNITED STATES PATENT OFFICE 2,101,032

METHOD FOR THE RECOVERY OF ARALKYL ETHERS OF CELLULOSE

Eugene J. Lorand, Wilmington, Del., assignor to Hercules Powder Company, Wilmington, Del., a corporation of Delaware No Drawing. Application October 6, 1934, Serial No. 747,209

10 Claims. (Cl. 260—152)

This invention relates to a method for the recovery of aralkyl ethers of cellulose from the crude reaction mixture in which they are formed.

Aralkyl ethers of cellulose, such as, for example, benzyl cellulose, phenylethyl cellulose, etc., are formed by the action of an aralkylating agent, usually an aralkyl halide, on an intimate admixture of cellulose and aqueous alkali, a material commonly referred to as alkali cellulose. At the conclusion of the reaction resulting in the formation of the aralkyl ether of cellulose the cellulose ether remains admixed with by-products and excess reagents. This admixture or reaction mass is a pasty, gummy mass comprising, in addition to the cellulose ether, sodium chloride (or other halide), sodium hydroxide, aralkyl halides, aralkyl ethers, polymerized aralkyl compounds of high molecular weight, etc. The recovery of the aralkyl ether of cellulose in substantially pure form from this reaction mass has always presented a difficult problem to the art.

Certain procedures for the recovery or purification methods heretofore known have involved the treatment of the reaction mass with an organic liquid which would dissolve the organic impurities present but not the aralkyl ether of cellulose. By such treatment the aralkyl ether of cellulose is "precipitated" and the precipitate is then washed further with such organic liquids to complete the purification. The precipitate is finally washed with water to remove all the inorganic impurities present and is then ready for use.

Despite the apparent simplicity of this procedure, it presents extraordinary difficulties. Unless the precipitated aralkyl ether of cellulose is granular, firm and porous in form, the complete removal of impurities therefrom is nearly impossible. The usual organic liquids used as "precipitants", such as, for example, gasoline, petroleum ether, methyl alcohol, ethyl alcohol, etc., tend to effect separation of the aralkyl ether of cellulose in a rather gummy, non-porous mass that is extremely difficult to purify further.

In my copending application, Serial No. 742,154, filed August 30, 1934, I have disclosed and claimed the use of aliphatic ethers, higher aliphatic alcohols, etc., as "precipitants" for aralkyl ethers of cellulose, and with these agents it is possible to recover the aralkyl ether from reaction mixtures in a form suitable for further purification. It is, nevertheless, desirable to effect satisfactory precipitation with the use of other precipitants.

Now in accordance with this invention I have found that by carefully controlling the conditions of precipitation it is possible to produce a hard, porous, granular precipitate of aralkyl ether of cellulose with the use of substantially any of the hitherto known precipitants, as, for example, gasoline, petroleum ether, ethyl alcohol, etc., and to enhance the desirable properties of the precipitate obtained with the use of those novel precipitants disclosed in my said copending application.

Hitherto in the precipitation of aralkyl ethers of cellulose the addition of the precipitant to the reaction mixture has either been sudden or gradual, and the results obtained have not been satisfactory in either procedure. Thus when the precipitant is added all at once to the reaction mass with vigorous agitation to effect thorough and rapid mixing, the aralkyl ether of celluose is precipitated in coarse, soft particles which tend to adhere to each other. The surface area presented by such a precipitate is small, occlusion of impurities is more or less certain and effectual further purification nearly impossible. On the other hand, when the precipitant is added gradually to the reaction mass and stirred into it slowly, the mass is first thinned and then, when a critical dilution is reached, the aralkyl ether of cellulose separates as a lower layer of viscous liquid or jelly, which, on further addition of precipitant and agitation, slowly hardens and breaks up into lumps. Unless the proper type of precipitant, as disclosed in my copending application referred to above, is used, the precipitate is gummy, non-porous and as difficult to purify further as that produced by rapid admixture of precipitant.

I have found, in accordance with this invention, that, if precipitation of the aralkyl ether of cellulose is effected by first slowly adding to the reaction mass sufficient precipitant to thin it to its minimum viscosity, without causing separation of the mass into two phases, and then adding the thinned mixture in a fine stream to a large excess of precipitant, or, less desirably, rapidly adding a large excess of precipitant to the thinned mixture, the aralkyl ether of cellulose is precipitated in the form of small, hard, porous granules which are easily washed free of impurities by the usual methods of further purification.

Almost any precipitant, i. e. a solvent for the by-products and impurities produced in etherification procedure which is a non-solvent of the aralkyl ether of cellulose, may be used in accordance with this invention, as, for example, gasoline, petroleum ether, ethyl alcohol, n-propyl alcohol, isopropyl alcohol, etc. A superior product, however, may be obtained by using the precipitants disclosed in my copending application referred to above, as, for example, a butyl alcohol, an amyl alcohol, ethyl ether, isopropyl ether, mixtures of petroleum hydrocarbon solvents and lower aliphatic alcohols, etc. With each precipitant the quantity of precipitant that can be added to the reaction mass before separation into two phases occurs is different. A test made on a small scale, however, will readily indicate the amount of any precipitant that may be added.

The initial addition of precipitant to the reaction mass may best be effected in a mixer adapted to handle doughy or viscous masses, as, for example, a dynamite mixer. The use of such a mixer is, however, not essential. The addition should be gradual and the added precipitant should be efficiently mixed into the reaction mass so that high concentrations of precipitant are not formed at the locus of addition.

When the proper amount of precipitant, as determined from a previous test, has been added, the reaction mass, which is now rather fluid, is added in fine streams to a large body of precipitant stirred vigorously with some suitable device. This addition may well be effected by causing the thinned reaction mass to flow through a suitably perforated nozzle either by gravity or under pressure. The aralkyl ether of cellulose is immediately precipitated in the form of hard porous granules.

Alternatively, and less desirably, a large excess of precipitant may be rapidly added to the thinned reaction mass and vigorously mixed into it with, for example, a stirrer of the propellor type.

The following examples are illustrative of practical procedure in accordance with my invention:

I. 500 g. of a reaction mass resulting from a completed benzylation and containing 15-20% benzyl cellulose are placed in a gelatine-dynamite-type mixing device with two parallel, vertical shafts carrying horizontal blades. The latter pass each other with relatively small clearance and exert a cutting effect on the thick pasty mass. 150-200 cc. petroleum ether are gradually introduced and worked into the mass by high speed agitation. The fluidity of the diluted mix is tested with a glass rod dipped into and lifted out of the mixture; an easy, continuous flow is desired. The presence of jelly particles and interruption of the flow indicate that too much precipitant has been used. This may be corrected by the addition of 50-100 g. of the original benzylation mass, or of 25-50 cc. benzyl chloride.

When proper fluidity is obtained, the mixture is transferred into a separatory funnel, the stopcock of which serves to regulate the flow into a large vessel containing 1000-1200 cc. petroleum ether, stirred vigorously with a lightning mixer. The stream of mixture from the separatory funnel coagulates in strings, which break up into short rods or granules of uniform size. When the precipitation is finished, the supernatant liquid is decanted, and the precipitate is washed several times with petroleum ether. The further purification of the product may be carried out according to any of the known procedures. For example, it may be freed from the adhering precipitant by distillation at low temperature in the presence of water and after the salts have been removed by washing with water, the product may be extracted with methanol.

II. 8 kilograms of a benzylation reaction mass containing 16-18% benzyl cellulose are placed in a closed mixing machine with fast moving blades, suitably arranged for the incorporation of a liquid into a viscous pasty mass. 3 liters of isopropyl alcohol are gradually introduced and worked into the mass. The mixture thus diluted is then tested for fluidity and, if necessary, corrected, as described in the previous example.

The removal of the diluted mixture from the apparatus is effected by air pressure through an outlet at the bottom of the mixing machine and a pipe line leading into the precipitator proper. This pipe ends in a properly constructed nozzle with several small openings, so that the mixture is discharged in as many thin parallel streams into 10-12 liters isopropyl alcohol. A uniformly granular precipitate is obtained, which, after decantation of the supernatant liquid, is washed 3—4 times with isopropyl alcohol and then with water. It may finally be extracted with methanol.

III. 250 g. of a benzylation reaction mass, containing 15-18% benzyl cellulose, are kneaded in a device equipped with two parallel shafts, the blades of which pass each other with a small clearance. 80-90 cc. of commercial heptane are added gradually and worked into the mass. In case a separation takes place (when the agitation is stopped), a small amount of benzyl chloride or 10-29 g. more of the original reaction mass may be worked in to restore the homogeneity of the mixture. Then 300-400 cc. more commercial heptane are dumped into the apparatus and the agitation is resumed at full speed. A uniform, granular precipitate of good porosity is obtained, which may be purified by washing with fresh precipitant, then with alcohol and, finally, with water.

IV. 1000 g. of a benzylation mixture similar to that used in Example III are placed in a Werner & Pfleiderer mixer. About 400-500 cc. isopropanol are gradually worked into the mass. In case of separation, adjustment is effected as in Example III. The dope obtained is transferred into a container equipped with a high-speed, propeller-type agitator. After the addition of 1500-2000 cc. isopropanol (all at once), the agitator is started immediately. The precipitate is then washed with fresh isopropanol and, finally, with water.

V. 500 g. of the same benzylation mass used in the previous example are thoroughly mixed in a ball mill with 300 cc. diamyl ether. Then the mixture is transferred into a large container equipped for efficient, high speed agitation, and rapidly mixed with 600 cc. more diamyl ether. The powdery or fine granular precipitate is washed three times with fresh precipitant by decantation, then with methanol and, finally, with water.

VI. 500 g. of the same benzylation mass used in Example III are treated in a Werner & Pfleiderer mixer with 250 cc. of a 50:50 (by volume) mixture of ethanol and commercial hexane. The resultant mixture, after being tested for fluidity, is conducted into 700 cc. of the ethanol-hexane mixture in the manner described in Example II. The precipitated benzyl cellulose is washed three times with the same mixture, then with ethanol alone, and finally with water.

It will be understood that the details and examples hereinbefore set forth are illustrative only, and that the invention as herein broadly described and claimed is in no way limited thereby.

What I claim and desire to protect by Letters Patent is:

1. The method of recovering an aralkyl ether of cellulose in the form of a firm, porous, granular precipitate from the mixture resulting from the reaction leading to its formation, which includes first adding to the reaction mixture an organic liquid which is a solvent for organic impurities contained therein and a non-solvent for said aralkyl ether of cellulose selected from the group consisting of liquid aliphatic alcohols, liquid aliphatic ethers and liquid aliphatic hydrocarbons, in amount sufficient to substantially reduce the viscosity of the reaction mixture but insufficient to cause the separation thereof into two phases, and then admixing the thinned reaction mixture with an additional quantity of said organic liquid larger than that first added.

2. The method of recovering an aralkyl ether of cellulose in the form of a firm, porous, granular precipitate from the mixture resulting from the reaction leading to its formation, which includes first adding to the reaction mixture an organic liquid which is a solvent for organic impurities contained therein and a non-solvent for said aralkyl ether of cellulose selected from the group consisting of liquid aliphatic alcohols, liquid aliphatic ethers and liquid aliphatic hydrocarbons, in amount sufficient to substantially reduce the viscosity of the reaction mixture but insufficient to cause the separation thereof into two phases, and then conducting the thinned reaction mixture in a stream into a quantity of said organic liquid larger than that first added.

3. The method of recovering an aralkyl ether of cellulose in the form of a firm, porous, granular precipitate from the mixture resulting from the reaction leading to its formation, which includes first adding to the reaction mixture an organic liquid which is a solvent for organic impurities contained therein and a non-solvent for said aralkyl ether of cellulose selected from the group consisting of liquid aliphatic alcohols, liquid aliphatic ethers and liquid aliphatic hydrocarbons, in amount sufficient to substantially reduce the viscosity of the reaction mixture but insufficient to cause the separation thereof into two phases, and then adding as rapidly as possible to the thinned reaction mixture an additional quantity of said organic liquid larger than that first added.

4. The method of recovering an aralkyl ether of cellulose in the form of a firm, porous, granular precipitate from the mixture resulting from the reaction leading to its formation, which includes first adding to the reaction mixture a liquid aliphatic alcohol which is a solvent for organic impurities contained therein and a non-solvent for said aralkyl ethers of cellulose, in amount sufficient to substantially reduce the viscosity of the reaction mixture but insufficient to cause the separation thereof into two phases, and then admixing the thinned reaction mixture with an additional quantity of said liquid aliphatic alcohol larger than that first added.

5. The method of recovering an aralkyl ether of cellulose in the form of a firm, porous, granular precipitate from the mixture resulting from the reaction leading to its formation, which includes first adding to the reaction mixture a liquid aliphatic ether which is a solvent for organic impurities contained therein and a non-solvent for said aralkyl ethers of cellulose, in amount sufficient to substantially reduce the viscosity of the reaction mixture but insufficient to cause the separation thereof into two phases, and then admixing the thinned reaction mixture with an additional quantity of said liquid aliphatic ether larger than that first added.

6. The method of recovering an aralkyl ether of cellulose in the form of a firm, porous, granular precipitate from the mixture resulting from the reaction leading to its formation, which includes first adding to the reaction mixture a liquid aliphatic hydrocarbon which is a solvent for organic impurities contained therein and a non-solvent for said aralkyl ethers of cellulose, in amount sufficient to substantially reduce the viscosity of the reaction mixture but insufficient to cause the separation thereof into two phases, and then admixing the thinned reaction mixture with an additional quantity of said liquid aliphatic hydrocarbon larger than that first added.

7. The method of recovering benzyl cellulose in the form of a firm, porous, granular precipitate from the mixture resulting from the reaction leading to its formation, which includes first adding to the reaction mixture an organic liquid which is a solvent for organic impurities contained therein and a non-solvent for said benzyl cellulose selected from the group consisting of liquid aliphatic alcohols, liquid aliphatic ethers and liquid aliphatic hydrocarbons, in amount sufficient to substantially reduce the viscosity of the reaction mixture but insufficient to cause the separation thereof into two phases, and then admixing the thinned reaction mixture with an additional quantity of said organic liquid larger than that first added.

8. The method of recovering benzyl cellulose in the form of a firm, porous, granular precipitate from the mixture resulting from the reaction leading to its formation, which includes first adding to the reaction mixture a liquid aliphatic alcohol which is a solvent for organic impurities contained therein and a non-solvent for said benzyl cellulose, in amount sufficient to substantially reduce the viscosity of the reaction mixture but insufficient to cause the separation thereof into two phases, and then admixing the thinned reaction mixture with an additional quantity of said liquid aliphatic alcohol larger than that first added.

9. The method of recovering benzyl cellulose in the form of a firm, porous, granular precipitate from the mixture resulting from the reaction leading to its formation, which includes first adding to the reaction mixture a propanol which is a solvent for organic impurities contained therein and a non-solvent for said benzyl cellulose, in amount sufficient to substantially reduce the viscosity of the reaction mixture but insufficient to cause the separation thereof into two phases, and then admixing the thinned reaction mixture with an additional quantity of said propanol larger than that first added.

10. The method of recovering an aralkyl ether of cellulose in the form of a firm, porous, granular precipitate from the mixture resulting from the reaction leading to its formation, which includes first adding to the reaction mixture an organic liquid which is a solvent for organic impurities contained therein and a non-solvent for said aralkyl ether of cellulose selected from the group consisting of liquid aliphatic alcohols, liquid aliphatic ethers and liquid aliphatic hydrocarbons, in amount sufficient to substantially reduce the viscosity of the reaction mixture but insufficient to cause the separation thereof in two phases, and then rapidly precipitating the aralkyl ether of cellulose from the thinned reaction mixture while maintaining the organic impurities present therein unprecipitated by admixing therewith an additional quantity of said organic liquid larger than that first added.

EUGENE J. LORAND.